Sept. 15, 1959 B. J. POWELL 2,903,907
PARKING BRAKE FOR VEHICLES
Filed Nov. 25, 1955 3 Sheets-Sheet 2

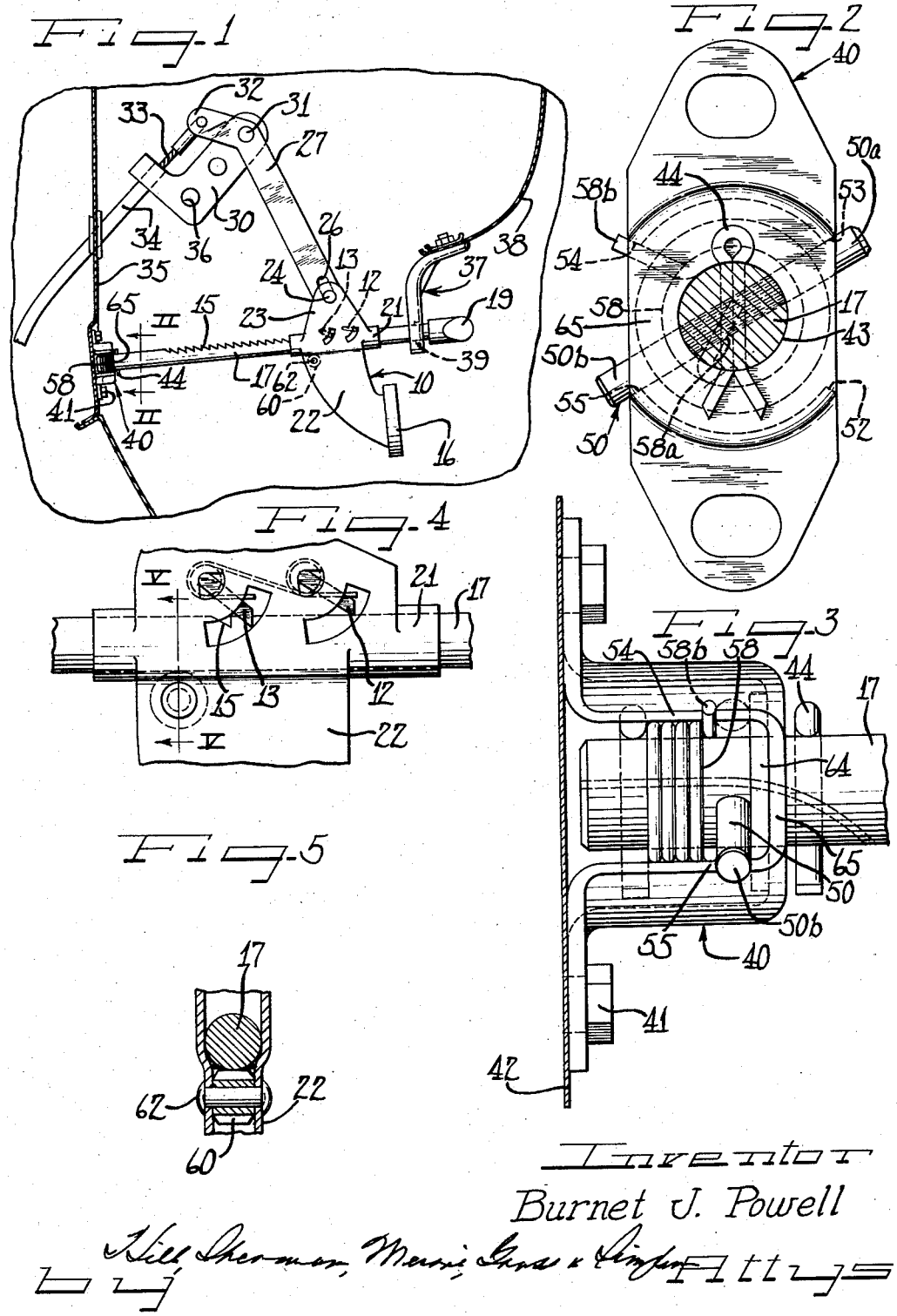

Inventor
Burnet J. Powell

Sept. 15, 1959
B. J. POWELL
2,903,907
PARKING BRAKE FOR VEHICLES
Filed Nov. 25, 1955
3 Sheets-Sheet 3
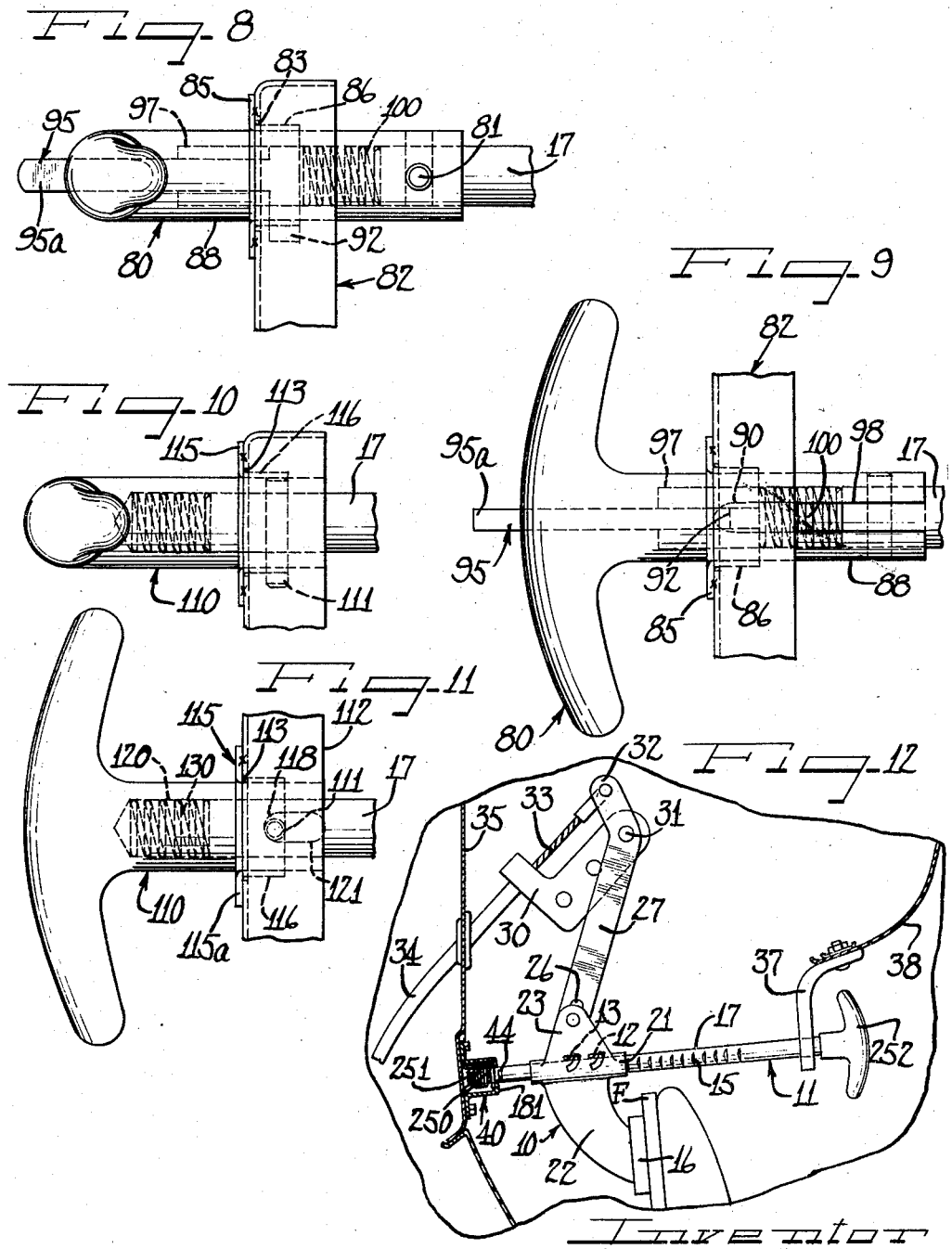
Inventor
Burnet J. Powell United States Patent Office 2,903,907
Patented Sept. 15, 1959

2,903,907

PARKING BRAKE FOR VEHICLES

Burnet J. Powell, Berkley, Mich., assignor, by mesne assignments, to The Bingham-Herbrand Corporation, a corporation of Ohio Application November 25, 1955, Serial No. 549,052

12 Claims. (Cl. 74—539)

This invention relates to a brake actuating assembly for vehicles, and particularly to a foot-operated brake actuating assembly which is retained in brake setting condition by means of a hand-controlled retaining mechanism.

It is an object of the present invention to provide an improved foot-operated, hand-released parking brake structure.

It is a further object of the present invention to provide a foot-operated brake structure wherein a hand control permits selectively the retention of the structure in an attained brake setting condition upon release of foot pressure, or the release of brake actuating force upon release of foot pressure.

It is still another object of the present invention to provide a foot-operated brake structure having a hand control of retention of the brake in an attained condition, and safety means for preventing accidental manipulation of said hand control means.

A specific feature of the present invention resides in the provision of a foot-operated brake structure comprising an elongated rod held fixed except for rotation on the longitudinal axis thereof with a foot-operated retention mechanism slidable on the rod and retained by the rod in incremental attained brake setting positions, the retention mechanism being releasable by rotation of the rod on its axis, and the brake applying force being transmitted from the retention mechanism to a brake-operating lever arm by means of a pin and slot connection therebetween.

According to a further feature of the invention, the brake retention mechanism includes a sleeve extended longitudinally of the release rod to engage the brake actuating lever at a point longitudinally spaced from the retaining mechanism carried by the sleeve.

According to another feature of the invention the brake retention mechanism which is slidable on the release rod has a pin projecting therefrom which engages in an elongated slot in a foot operated brake lever or in a link connected therewith so that as the foot pedal carried with the lever is depressed, the retention mechanism slides along the release rod and the pin travels in the elongated slot to compensate for the relative motion between the longitudinally moving retention mechanism and the swinging movement of the brake lever or link.

According to a still further feature of the present invention, the release rod is normally spring urged out of retaining relation to the retention mechanism so that a definite manual manipulation of the release rod is necessary in order that the brakes be retained in a set condition, the brakes being released simply by pressure on the foot pedal which allows the spring to return the release rod to normal release condition.

Other and further important features and objects of the present invention will be more fully apparent from the following detailed description taken in conjunction with the accompanying drawings, in which:

Figure 1 is a side elevational view of a first embodiment of the present invention with portions of the vehicle to which the foot brake assembly is attached being shown in section;

Figure 2 is an enlarged vertical cross sectional view taken generally along the line II—II of Figure 1;

Figure 3 is an enlarged fragmentary elevational view of the structure at the front end of the release rod;

Figure 4 is a fragmentary enlarged elevational view of the retention mechanism shown in Figure 1;

Figure 5 is a vertical cross sectional view taken along the line V—V of Figure 4 and showing a bearing arrangement for facilitating sliding of the retention mechanism on the release rod;

Figure 8 is a fragmentary side elevational view of a first safety handle construction for the brake lever assembly of Figure 1, 6 or 7;

Figure 9 is a top plan view of the structure of Figure 8;

Figure 10 is a fragmentary side elevational view of a second form of handle structure for the brake assembly of Figure 1, 6 or 7;

Figure 11 is a top plan view of the structure of Figure 10; and

Figure 12 is a fragmentary side elevational view illustrating a fourth form of brake assembly in accordance with the present invention.

As shown on the drawings:

Figure 6:
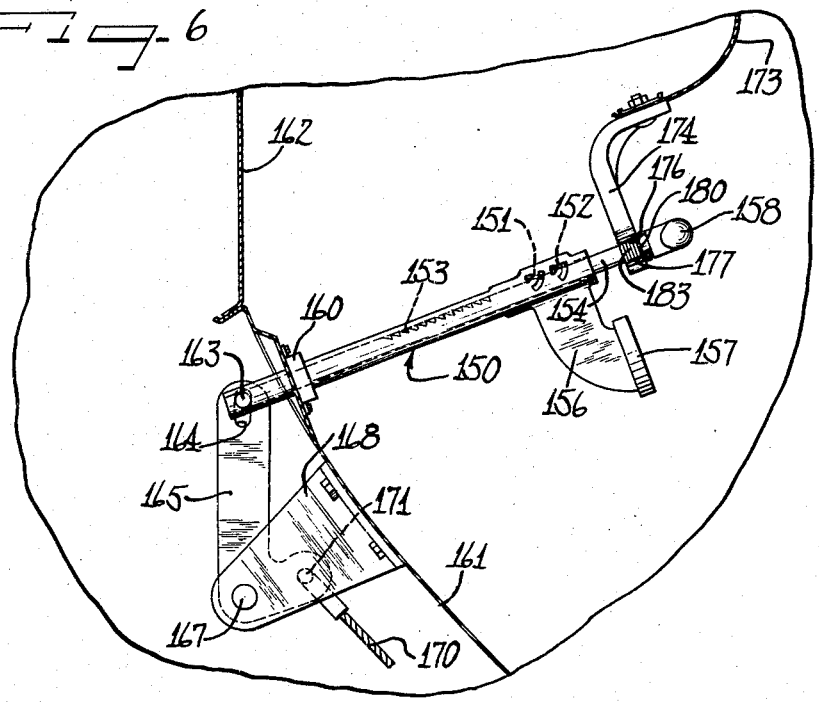
Figure 6 is a fragmentary side elevational view illustrating a second form of brake assembly in accordance with the present invention.

Figures 1 to 5 illustrate a first form of brake lever assembly according to the present invention. The assembly includes a foot-operated brake applying mechanism 10 slidable along a manually rotatable rod 17 to apply a progressively greater brake setting force to the brakes of the vehicle. The brake applying mechanism has pivotally mounted pawls 12 and 13 which are cooperable with ratchet teeth 15 on the rod 17 in one angular position of the rod to retain the applying mechanism in successive positions along the rod to which the applying mechanism is moved by pressing of the foot of the operator upon the foot pedal 16. To release the brakes, the rod 17 is rotated by means of a handle 19 on the rear end thereof to disengage the ratchet teeth from pawls 12 and 13.

More specifically, the brake applying mechanism includes a sleeve 21 slidable upon the release rod 17 and connected with the foot pedal 16 by means of a depending flange structure 22. For coupling the sleeve to a brake applying lever 27, the sleeve carries upwardly extending ear portions 23 which have a pin 24 extending therebetween and through an elongated slot 26 of the brake applying lever 27, the slotted end of the lever extending between the ear portions 23. The brake applying lever 27 is pivotally mounted by means of a bracket 30 and pivot pin 31 and has its upper end 32 connected to a brake cable 33 which extends in an elongated housing 34 through the fire wall 35 of the vehicle. The bracket 30 is preferably fastened to the left side panel of the vehicle by means of apertures 36.

The hand release rod 17 is mounted at its rearward end by means of a bracket 37 secured to the instrument panel 38 of the vehicle. The bracket 37 provides a suitable journal 39 allowing rotation of the rod 17 on its longitudinal axis. At the forward end, the rod is journaled in a housing 40 secured by means of fastening elements 41 to the fire wall 35 of the vehicle. The housing has a rear wall 65 with an aperture 43 as seen in Figure 2 closely receiving the forward end of the release rod 17 for guiding rotational movement of the rod 17 on its axis. A cotter pin 44 extends through the rod 17 in front of the housing 40 to limit axial displacement of the rod 17 in the forward direction.

For limiting angular movement of the release rod 17, a pin 50 extends diametrically through the rod and has end portions 50a and 50b cooperating with respective stop shoulders 52, 53 and 54, 55 provided by the housing 40.

For biasing the release rod 17 toward its ratcheting angular orientation, a torsion spring 58 is disposed around the end of the rod 17 within the housing 40 and has one end 58a extending into a recess in the rod 17 while its opposite end 58b extends radially from the rod into engagement with the stop shoulder 54. The release rod may be urged either toward an extreme clockwise or counterclockwise angular orientation, which may be either the ratcheting orientation or a non-ratcheting orientation. In the present instance, the torsion spring 58 is connected between the rod 17 and the housing 40 so as to urge the rod into its extreme counterclockwise position looking from the rear of the vehicle toward the front as seen in Figure 2. Also, this extreme counterclockwise position as shown in Figure 2 is the ratcheting angular orientation of the rod 17 with the ratchet teeth at the top of the rod as seen in Figure 1 and Figure 4 for cooperation with the ratchet pawls 12 and 13.

Preferably, the sleeve 21 carries a thrust roller 60 for riding on the lower portion of the rod 17 as the retaining mechanism 10 is moved forwardly along the rod. The roller is retained in place on the flange structure 22 by means of a rivet 62 at the forward end of the flange structure 22. A thrust washer 64 is provided within the housing 40 between the pin 50 and the rear bearing wall 65 of the housing to absorb the thrust exerted on the release rod 17 by the brake tension when the retaining mechanism 10 is in a brake setting position along the rod 17.

*Operation of embodiment of Figure 1*

To apply the brakes, therefore, the left foot of the operator is placed on the foot pedal 16 and moved forwardly to move the retaining mechanism 10 along the release rod 17 with the pawls 12 and 13 alternately engaging successive ratchet teeth 15 to hold the retaining mechanism 10 in the position to which moved, this forward movement of the retaining mechanism pivoting the linkage arm 27 to pull generally rearwardly on the cable 33 to apply the brakes.

To release the brakes, the handle 19 is turned in the direction required by the housing 40 a predetermined angular distance to move the ratchet teeth 15 out of engagement with the pawls 12 and 13, whereupon the tension of the brakes on the cable 33 will cause the linkage arm 27 to return toward its original position thereby moving the retaining assembly 10 rearwardly to the position shown in Figure 1.

Figures 8 and 9 indicate a first form of handle construction for substitution for the handle 19 of Figure 1. A handle 80 is illustrated as being attached to the release rod 17 by means of a pin 81 and has associated therewith a bracket 82 which may be secured to the instrument panel 38 in Figure 1. The bracket 82 has a cylindrical aperture 83 therethrough and has a boss plate 85 secured at the rear side thereof with a cylindrical boss 86 extending through the aperture 83 and providing a journal for the cylindrical hub portion 88 of the handle 80. As seen in Figure 9, the boss 86 has a recess 90 extending rearwardly from the forward end thereof for receiving a leg 92 of an actuating bar 95 reciprocably mounted centrally within the handle 80. The handle hub portion 88 has a cylindrical bore 97 and a radial slot 98 extending from the bore to the periphery of the hub portion 88 for accommodating reciprocating movement of the leg 92 of the actuating bar within the hub portion 88. The cylindrical bore 97 contains a compression spring 100 bottomed at one end against the rear end of the release rod 17 and acting at the other end against the leg 92 of the actuating bar 95 to urge the actuating bar into handle locking relation to the recess 90 with a rear end portion 95a of the actuating bar projected at the rear of the handle. To rotate the release rod 17 to release the brakes, the actuating bar end 95a must first be depressed to move the leg 92 out of the cooperating recess 90 in the boss member 85. Thereafter, the handle is free to rotate relative to the boss member 85 and bracket 82 to move the release rod into release angular orientation where the ratchet teeth clear the pawls to allow the brake applying mechanism 10 to return to its rearward brake release position.

In the handle construction of Figures 10 and 11, the handle 110 is designed to replace the handle 19 in Figure 1 and to be attached to the release rod 17 by means of a pin 111 carried by the handle and extending through an elongated slot 121 in the rod. The handle is associated with a bracket 112 having an aperture 113 therethrough with a boss plate 115 having a cylindrical boss portion 116 extending through the aperture 13 and radial part 115a of the boss plate being secured to the bracket 112. The boss portion 116 has a recess 118 for engaging pin 111 to hold the handle 110 against rotation relative to the boss plate 115. To accommodate disengagement of the pin 111 from recess 118, the handle is provided with a cylindrical bore 120 receiving the end of release rod 17 so that the handle 110 is slidable on the rod, and the rod has an elongated slot 121 to accommodate longitudinal movement of the pin 111 as the handle is moved longitudinally forwardly on the release rod 17. Movement of the pin 111 to the forward end of the slot 121 in the release rod 17 clears the pin 111 of the recess 118 in the boss portion 116 to accommodate rotation of the release rod 17 by rotation of the handle 110 and the pin 111. Rotational torque from the handle is transmitted through the pin 111 to the side walls of the elongated slot 121 in the rod. Compression spring 130 is disposed in the rear end of the bore 120 and acts on the rear end of the release rod 17 and on the handle so as to urge the handle rearwardly relative to the release rod to urge the pin 111 into the recess 118 of the boss 116. To rotate the release rod in this case, the handle 110 is bodily moved forward to carry the pin 111 clear of the recess 118 in the boss 116 whereupon the handle may be rotated and the rotational movement transmitted through the pin 111 and the walls of the slot 121 to the release rod 17.

Figure 6 illustrates a modified form of brake applying mechanism, and a modified release mechanism. In this case, an elongated tubular housing 150 carries ratchet pawls 151 and 152 cooperating with ratchet teeth 153 of a release rod 154. The housing 150 has a depending flange structure 156 carrying a foot pedal 157. The housing 150 is slidable on the release rod 154 and slides in a bearing member 160 secured to a sloping panel 161 extending between the fire wall 162 and the horizontal floor panel. At its forward end, the housing 150 carries a pin 163 extending into an elongated slot 164 of an actuating arm or crank 165 of the brake mechanism. The crank 165 is pivotally mounted by means of a pin 167 on a bracket 168 carried by the panel 161 and is connected to a brake actuating cable 170 as indicated at 171.

The rear end of the release rod 154 is supported from the instrument panel 173 by means of a bracket 174 having stop shoulders 176 and 177 corresponding to the stop shoulders 54 and 55 of Figure 2. The bracket 174 may provide a wall portion 180 at the rear thereof corresponding to the wall portion 65 in Figures 1 and 2 having a cylindrical aperture of diameter corresponding to the diameter of the release rod 154 to journal the release rod for rotation. A thrust washer corresponding to the thrust washer 64 in Figure 3 bears against the wall portion 180 to prevent rearward axial displacement of the release rod 154 due to the tension of the brakes. A pin corresponding identically to the pin 50 in Figure 3 projects outwardly from the release rod forwardly of the wall portion 180 for anchoring the thrust washer and for cooperation with stop shoulders such as 176 and 177 corresponding to shoulders 54 and 55 on one side of the bracket 174 and stop shoulders of corresponding configuration on the opposite side of the bracket 174 corresponding to the shoulders 52 and 53 in Figure 2. A torsion spring 183 in Figure 6 is arranged entirely similarly to the torsion spring 58 in Figure 3 for biasing the release rod 154 toward one angular position, for example the angular position shown in Figure 6 with the teeth 153 in engageable relation to the pawls 151 and 152. The forward end of the torsion spring 183 extends into a recess in the release rod 154 as illustrated at 58a in Figure 2, and the opposite rear end of the torsion spring 183 extends radially into engagement with the shoulder 176 as illustrated at 58b in Figure 2. In Figure 6, suitable means may be provided for preventing rotation between the housing 150 and the tubular bearing 160 such as a slot in the tubular housing 150 and a suitable key cooperating therewith and carried by the bearing 160.

*Operation of the embodiment of Figure 6*

Thus, to apply the brakes in the structure of Figure 6, the left foot of the operator depresses foot pedal 157 to move the housing 150 forwardly on the release rod 154 and pivot the crank 165 counterclockwise tensioning the brake actuating cable 170. The pawls 151 and 152 alternately engage the teeth 153 on the release rod 154 to retain the housing 150 in a forward position to which moved by the operator. To release the brakes, the handle 158 may be rotated in either direction to disengage the teeth 153 from the pawls 151 and 152. In the illustrated embodiment, the handle 158 is turned in a clockwise direction to tension the torsion spring 183 and move the teeth 153 out of engagement with the pawls 151 and 152 whereupon the tension of the brakes is sufficient to rotate the crank 165 in the clockwise direction and move the housing 150 rearwardly to the initial position shown in Figure 6.

It will be understood that the handle 158 may be of the type shown in Figures 8 and 9 or Figures 10 and 11 if desired.

Figure 7:
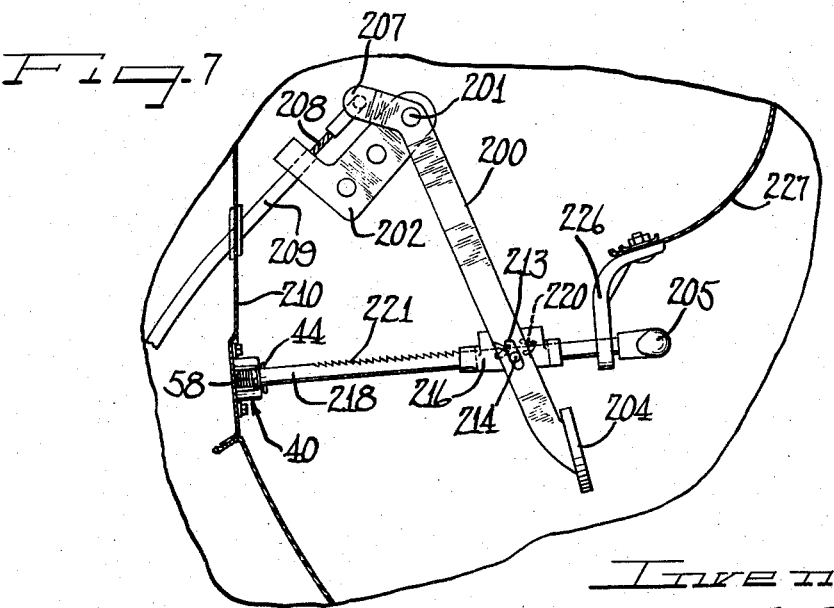
Figure 7 is a fragmentary elevational view illustrating a third form of brake assembly in accordance with the present invention.

Figure 7 illustrates a further modified form of the present invention and in this embodiment, a brake lever arm 200 is pivoted at 201 to a bracket 202 secured, for example, to the left side panel of the vehicle with which the brake assembly is associated. At its lower end, the lever arm 200 carries a foot pedal 204 and at its upper end, the arm 200 has an end portion 207 connected to the brake actuating cable 208. The cable 208 is guided by means of a tube 209 extending through the fire wall 210 of the vehicle.

The lever arm 200 is provided with an elongated slot 213 receiving a pin 214 carried by a brake retaining sleeve 216 which is slidable on release rod 218. The sleeve 216 carries pivotal pawls such as 220 for cooperation with ratchet teeth 221 on the release rod 218. The release rod 218 has a bias housing 40 at its forward end entirely identical to the housing 40 of Figure 3, and the same reference numerals have been applied to corresponding parts. At its rearward end, the release rod 218 is mounted by means of a bracket 226 secured to the instrument panel 227 of the vehicle.

*Operation of the embodiment of Figure 7*

To apply the brakes in the structure of Figure 7, the foot of the operator depresses foot pedal 204 to pivot the lever 200 about its pin 201 tensioning the brake cable 208. Simultaneously, the lever arm 200 moves the retaining sleeve 216 along the release rod 218 with the pawls 220 alternately engaging the teeth 221 to maintain the lever 200 in a position to which advanced by depression of the foot pedal 204. To release the brakes, the handle 205 is turned in a direction to disengage the teeth 221 from the ratchet pawls 220, for example in the clockwise direction for the release rod bias housing shown in Figures 2 and 3. The tension of the brakes then returns the brake lever 200 and the retaining mechanism 216 to the initial position shown in Figure 7, and upon release of the handle 205, the handle is moved by the torsion spring 58 back to the angular orientation shown in Figure 7. It will be understood that the handle of Figures 8 and 9 or Figures 10 and 11 could replace the handle 205 of Figure 7 and the bracket 226 could have the configuration illustrated in these figures.

Figure 12 illustrates a brake structure similar to that of Figure 1, and corresponding reference numerals have been applied to corresponding parts in Figures 1 and 12. The difference between Figures 1 and 12 resides in the fact that a pin 250 in Figure 12 extends through the release rod 17 in a different relation with respect to the ratchet teeth 15 than does the pin 50 of Figures 1 and 3. Thus, in Figure 12, torsion spring 251 normally urges the release rod 17 into the orientation shown in Figure 12 with the teeth 15 out of ratcheting relation to the pawls 12 and 13. Thus, if the foot pedal 16 is depressed by the foot of the operator indicated at F with the handle in normal position, continuous pressure by the foot is required to maintain the brakes in actuated condition and upon release of the pressure on the pedal 16, the brakes will return to deactuated condition automatically. To utilize the structure of Figure 12 as a parking brake where the brakes are to be retained in set condition, the handle 252 must be rotated in the clockwise direction to place the ratchet teeth 15 in operative relation to the pawls 12 and 13 during or after application of the brake setting force. The tension of the brakes tending to urge the sleeve 21 in the rearward direction exerts sufficient frictional force on the ratchet teeth to prevent rotation of the release rod 17 out of ratcheting relation in spite of the force exerted by the torsion spring 251 tending to rotate the release rod to non-ratcheting orientation. To release the brakes, it is simply necessary to apply a slight pressure to the foot pedal 16 relieving the pressure of the brakes and allowing the torsion spring 251 to move the release rod 17 to inoperative orientation shown in Figure 12. It will be understood that an enlarged view of the housing structure shown at 40 in Figure 12 would be identical to the view shown in Figure 3, the only difference in the structure of Figure 12 being that the teeth are at the side of the release rod 17 rather than at the top as would be the case in Figure 3. The handle 252 on the release rod 17 of Figure 12, may of course be of the type illustrated in Figures 8 and 9 or Figures 10 and 11.

*Operation of the embodiment of Figure 12*

In Figure 12, if the brakes are to be applied during the time when a vehicle is in motion, the foot is applied to the pedal 16 to pivot lever 27 and apply the tension to the brake cable 33. In this case, when the foot pressure is released from the pedal 16, the brakes automatically return to non-braking condition. When the vehicle is at rest, and it is desired to apply the brake, foot pressure is applied to the pedal 16, and the handle 252 is turned in the appropriate direction, in this case, clockwise looking from the rear of the vehicle toward the front to cause the teeth 15 to move into ratcheting relation to the pawls 12 and 13. When the brakes have been set to the desired tension, and while still retaining the handle 252 in its clockwise position, the braking force is released from the pedal 16 to create a frictional force between the teeth 15 and the pawl 12 or 13 preventing rotation of the release rod 17 back into its inoperative position by means of torsion spring 251. The brake tension is then operative to retain the release rod 17 in its extreme clockwise ratcheting orientation. To release the brakes in this case, slight foot pressure is applied to the pedal 16, and the torsion spring 251 then automatically returns the release rod 17 to its inoperative orientation shown in Figure 12.

A feature of the present invention resides in means for conditioning a brake assembly of a vehicle to be retained in a brake applying condition after a momentary actuation thereof by an operator to cause the assembly to act as a parking brake in combination with means for conditioning the assembly to prevent retention thereof in brake applying condition while the vehicle is in motion. This feature allows the brake assembly to act as an emergency brake without the danger of "panic lock" of the brakes after an emergency application thereof. In prior art parking brakes, the retention mechanism is operative while the vehicle is in motion and can only be released by a separate manipulation. If in an emergency the operator forgets to release the retention mechanism, the brakes will lock and the vehicle may go into a skid. It will be apparent to those skilled in the art that the present invention is readily applied to the various existing types of brake actuating assemblies, including manually operated straight pull brake lever assemblies, and foot operated assemblies.

It will be understood that many modifications and variations may be effected without departing from the scope of the present invention.

I claim as my invention:

1. A brake lever construction comprising an elongated rod having a series of ratchet teeth therealong, means journally supporting said rod at each of its end regions for rotation on its longitudinal axis, an elongated sleeve member having opposite end portions extending around said rod in sliding relation thereto to retain said sleeve member on said rod, said sleeve member having a body portion intermediate said end portions and integral therewith, said body portion having a pair of spaced wall portions extending therefrom, a plurality of pawls pivotally carried between said wall portions and extending into engageable relation to said ratchet teeth for retaining said sleeve member in successive incremental position along said rod by interengagement of said pawl means with successive ratchet teeth along said rod, and brake actuating means coupled to said sleeve member to advance said sleeve member along said rod as said brake actuating means is moved in brake setting direction, said sleeve member being coupled to said brake actuating means to retain said brake actuating means in brake setting positions to which moved, and said ratchet teeth being releasable from said pawls by rotation of said rod to release said sleeve member and said brake actuating means for return to an initial brake release position.

2. A brake lever construction comprising an elongated rod having a series of ratchet teeth therealong, bracket means supporting said rod for rotation on its longitudinal axis, an elongated sleeve member having opposite end portions extending around said rod in sliding relation thereto to retain said sleeve member on said rod, said sleeve member having a body portion intermediate said end portions and integral therewith, said body portion having a pair of spaced wall portions extending therefrom, pawl means pivotally carried between said wall portions and extending into engageable relation to said ratchet teeth for retaining said sleeve member in successive incremental positions along said rod by interengagement of said pawl means with successive ratchet teeth along said rod, the sleeve member intermediate body portion having a flange structure depending therefrom, a foot pedal on said flange structure, a lever arm for actuating the brakes of a vehicle by pivotal movement thereof and having a lower end disposed between said wall portions with an elongated slot in said lower end, a pin carried by the wall portions and extending through said slot to provide a lost motion connection between said lever arm and said sleeve member, and bracket means pivotally mounting said lever arm, said sleeve member being operative upon advance thereof along said rod by means of a force exerted on said foot pedal to pivot said lever arm toward brake setting position, and the sleeve member pawl means being operative in conjunction with the rod ratchet teeth to retain said lever arm in a brake setting position until said rod is rotated to release said pawl means from said ratchet teeth.

3. A brake lever construction comprising an elongated rod having a series of ratchet teeth therealong, bracket means supporting said rod for rotation on its longitudinal axis, an elongated sleeve member having opposite end portions extending around said rod in sliding relation thereto to retain said sleeve member on said rod, said sleeve member having a body portion intermediate said end portions and integral therewith, said body portion having a pair of spaced wall portions extending therefrom, pawl means pivotally carried between said wall portions and extending into engageable relation to said ratchet teeth for retaining said sleeve member in successive incremental position along said rod by interengagement of said pawl means with successive ratchet teeth along said rod, a unitary lever arm extending from a point above said release rod past said sleeve member to a point below said rod and having an elongated slot adjacent said sleeve member, bracket means pivotally mounting said lever arm at a point above said rod, said lever arm having means for attachment to a brake actuating cable for setting of the brakes by pivotal movement of the arm, and pin means carried by said sleeve member and extending into said elongated slot of said lever arm for connecting said sleeve member to said lever arm, pivotal movement of said lever arm toward brake setting position being operative to slide said sleeve member along said rod, and said sleeve member being operative to retain said lever arm in a brake setting position to which it is moved, said pawl means being releasable from said ratchet teeth by rotation of said rod to release said lever arm for return to an initial brake release position.

4. A brake lever construction comprising an elongated rod having a series of ratchet teeth therealong, bracket means supporting said rod for rotation on its longitudinal axis, a foot operated elongated sleeve member having opposite end portions extending around said rod in sliding relation thereto to retain said sleeve member on said rod, said sleeve member having a body portion intermediate said end portions and integral therewith, said body portion having a pair of spaced wall portions extending therefrom, pawl means pivotally carried between said wall portions and extending into engageable relation to said ratchet teeth for retaining said sleeve member in successive incremental position along said rod by interengagement of said pawl means with successive ratchet teeth along said rod, and brake actuating means coupled to said sleeve member to advance said sleeve member along said rod as said brake actuating means is moved in brake setting direction, said sleeve member being coupled to said brake actuating means to retain said brake actuating means in brake setting positions to which moved, and said ratchet teeth being releasable from said pawl means by rotation of said rod to release said sleeve member and said brake actuating means for return to an initial brake release position, the forward end portion of said sleeve extending along a major portion of the length of said rod and having means at the forward end thereof for actuating the brakes of a vehicle, said sleeve forward end portion being adapted to extend through a panel adjacent the floor of the passenger space of the vehicle.

5. A brake lever construction comprising an elongated rod having a series of ratchet teeth therealong, bracket means supporting said rod for rotation on its longitudinal axis, an elongated sleeve member having opposite end portions extending around said rod in sliding relation thereto to retain said sleeve member on said rod, said sleeve member having a body portion intermediate said end portions and integral therewith, said body portion having a pair of spaced wall portions extending therefrom, pawl means pivotally carried between said wall portions and extending into engageable relation to said ratchet teeth for retaining said sleeve member in successive incremental position along said rod by interengagement of said pawl means with successive ratchet teeth along said rod, the sleeve member intermediate body portion having a flange structure depending therefrom, a foot pedal on said flange structure, a lever arm for actuating the brakes of a vehicle by pivotal movement thereof and having a lower end disposed between said wall portions with an elongated slot in said lower end, a pin carried by the wall portions and extending through said slot to provide a lost motion connection between said lever arm and said sleeve member, and bracket means pivotally mounting said lever arm, said sleeve member being operative upon advance thereof along said rod by means of a force exerted on said foot pedal to pivot said lever arm toward brake setting position, and the sleeve member pawl means being operative in conjunction with the rod ratchet teeth to retain said lever arm in a brake setting position until said rod is rotated to release said pawl means from said ratchet teeth, and a thrust roller carried by said intermediate body portion in bearing relation to said rod.

6. A brake lever construction comprising an elongated rod having a series of ratchet teeth therealong and a manipulating handle at one end, bracket means for supporting said rod adjacent the handle for rotation on its longitudinal axis, an elongated sleeve member carried in longitudinally slidable relation on said rod and having pivotally supported pawl means cooperable with said ratchet teeth to retain said sleeve member in successive incremental positions along said rod, brake actuating means coupled to said sleeve member to advance said sleeve member along said rod as said brake actuating means is moved in brake setting direction and said sleeve member being operable to retain said brake actuating means in the brake setting position to which moved by interengagement between said pawl means and the ratchet teeth of said rod, said ratchet teeth being releasable from said pawl means by rotation of said rod to release said sleeve member and said brake actuating means for return to an initial brake release position, a cup-shaped housing for mounting in said vehicle having an end wall with an aperture receiving the other end of said rod to provide a bearing accommodating rotation of the rod relative to the housing, a thrust washer on said rod within said housing and disposed for abutment against the end wall of said housing, a pin extending through said rod on the other side of said thrust washer from said end wall and disposed in abutting relation to said thrust washer, said housing having longitudinal slots at opposite sides thereof whose longitudinally extending edges are engageable with opposite ends of said pin projecting from said rod to limit rotation of said rod relative to said housing.

7. A brake lever construction comprising an elongated rod having a series of ratchet teeth therealong and a manipulating handle at one end, bracket means for supporting said rod adjacent the handle for rotation on its longitudinal axis, an elongated sleeve member carried in longitudinally slidable relation on said rod and having pivotally supported pawl means cooperable with said ratchet teeth to retain said sleeve member in successive incremental positions along said rod, brake actuating means coupled to said sleeve member to advance said sleeve member along said rod as said brake actuating means is moved in brake setting direction and said sleeve member being operable to retain said brake actuating means in the brake setting position to which moved by interengagement between said pawl means and the ratchet teeth of said rod, said ratchet teeth being releasable from said pawl means by rotation of said rod to release said sleeve member and said brake actuating means for return to an initial brake release position, a cup-shaped housing for mounting in said vehicle having an end wall with an aperture receiving the other end of said rod to provide a bearing accommodating rotation of the rod relative to the housing, a thrust washer on said rod within said housing and disposed for abutment against the end wall of said housing, a pin extending through said rod on the other side of said thrust washer from said end wall and disposed in abutting relation to said thrust washer, said housing having longitudinal slots at opposite sides thereof whose longitudinally extending edges are engageable with opposite ends of said pin projecting from said rod to limit rotation of said rod relative to said housing, and torsion spring means engaging said rod and one of the edges of said slot in said housing to urge said rod toward one angular position relative to said housing.

8. A brake lever construction comprising an elongated rod, bracket means supporting said rod for rotation on its longitudinal axis, an elongated tubular sleeve member telescoping over said rod and slidable therealong and having a longitudinal extent equal to at least a major portion of the length of said rod, said sleeve member having means thereon cooperable with said rod for retaining said sleeve member at successive incremental positions along said rod and being releasable by rotation of said rod, foot operated brake actuating means coupled to said tubular member to advance said tubular member along said rod as said brake actuating means is moved in brake setting direction, said tubular member being operable to retain said brake actuating means in a brake setting position to which moved, and said sleeve member extending through a panel of the vehicle and having means at the end of said sleeve tubular member outside of the passenger compartment for connection to the brakes of the vehicle for actuating the same.

9. A brake lever construction comprising an elongated rod, bracket means supporting said rod for rotation on its longitudinal axis, a sleeve member telescoping over said rod and movable longitudinally therealong and having means carried thereby for retaining said sleeve member in successive incremental positions along said rod and being releasable by rotation of said rod on its longitudinal axis, a unitary brake lever arm extending from above the rod downwardly past the sleeve member and terminating in a position below said rod and having a foot pedal at its lower end, bracket means pivotally mounting said lever arm above said rod, said sleeve member and said lever arm having a cooperating pin and slot connection coupling said lever arm to said sleeve member for moving said sleeve member along said rod as said lever arm is pivoted toward brake setting position and for retaining said brake lever arm in an attained brake setting position.

10. A brake lever construction comprising an elongated rod, bracket relatively stationary means disposed adjacent each end region of the rod and journally supporting said rod for rotation on its longitudinal axis, a sleeve member movable along said rod and having means cooperable with said rod to retain said sleeve member in successive incremental positions along said rod in one angular orientation of the rod, said rod being rotatable to release said means and allow return of said sleeve member to an initial position, brake actuating means coupled to said sleeve member to advance said sleeve member along said rod as said brake actuating means is moved in brake setting direction, said sleeve member being coupled to said brake actuating means to retain said brake actuating means in an attained brake setting condition to which moved, and a handle slidably mounted on the end of said rod and having means associated therewith normally preventing rotation of said rod, said handle being slidable on said rod to release said preventing means and accommodate rotation of said rod to release the brake.

11. A brake lever construction comprising an elongated rod having a series of ratchet teeth along one side thereof, bracket means supporting said rod for rotation on its longitudinal axis to move said ratchet teeth to a first orientation, a sleeve member slidable along said rod and having pawl means normally engaging a smooth surface of said rod but being engageable with said ratchet teeth upon rotation of said rod to bring said ratchet teeth to said first orientation, spring means urging said rod into a second regular orientation with said teeth out of engageable relation to said pawl means, foot operated brake actuating means coupled to said sleeve member to advance said sleeve member along said rod as said brake actuating means is moved in brake setting direction, handle means for rotating said rod to move said ratchet teeth to said first orientation to retain said sleeve member in a position to which moved, and said sleeve member being operable to retain said brake actuating means in the brake setting position to which moved upon engagement of said pawl means with said ratchet teeth and release of said brake actuating means to apply the brake tension between said pawl means and said ratchet teeth to frictionally resist rotation of the rod to said second non-ratcheting orientation.

12. In a brake controlling structure, a foot operated brake actuating assembly including a control rod and pawl means, handle means for positioning the control rod for retaining the brake actuating assembly in brake applying condition upon actuation thereof by an operator to cause said assembly to hold the vehicle brakes in set position, said handle means being movable to a position to prevent retention of the brake actuating assembly in brake applying condition after the actuation thereof, and resilient means cooperable with said control rod for continuously urging said control rod toward a position preventing retention of the brake actuating assembly in brake setting position.

References Cited in the file of this patent

UNITED STATES PATENTS

| | | |
|---|---|---|
| 2,136,095 | Baumheckel | Nov. 8, 1938 |
| 2,180,209 | Johnson | Nov. 14, 1939 |
| 2,183,772 | Johnson | Dec. 19, 1939 |
| 2,315,962 | Jandus | Apr. 6, 1943 |
| 2,531,130 | Jandus | Nov. 21, 1950 |
| 2,553,753 | Devor | May 22, 1951 |
| 2,631,470 | Sandberg | Mar. 17, 1953 |
| 2,632,338 | Sandberg | Mar. 24, 1953 |
| 2,664,014 | Feemster | Dec. 29, 1953 |
| 2,669,883 | Duncan | Feb. 23, 1954 |
| 2,682,178 | Powell | June 29, 1954 |
| 2,735,311 | Hinsey | Feb. 21, 1956 |
| 2,739,672 | Sandberg | Mar. 27, 1956 |
| 2,751,794 | Sandberg | June 26, 1956 |
| 2,835,139 | Sandberg | May 20, 1958 |